(12) United States Patent
Begur et al.

(10) Patent No.: US 9,165,100 B2
(45) Date of Patent: Oct. 20, 2015

(54) METHODS AND APPARATUS TO MAP SCHEMATIC ELEMENTS INTO A DATABASE

(71) Applicant: HONEYWELL INTERNATIONAL INC., Morristown, NJ (US)

(72) Inventors: Nagabhushana Rao Begur, Glendale, AZ (US); Tim Felke, Glendale, AZ (US); Jeff vanderZweep, Peoria, AZ (US); Raghupathy Kolandavelu, TamilNadu (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 124 days.

(21) Appl. No.: 14/097,432

(22) Filed: Dec. 5, 2013

(65) Prior Publication Data

US 2015/0161301 A1    Jun. 11, 2015

(51) Int. Cl.
*G06F 17/50* (2006.01)
*G06K 9/00* (2006.01)

(52) U.S. Cl.
CPC .......... *G06F 17/505* (2013.01); *G06F 17/5045* (2013.01); *G06F 17/5086* (2013.01); *G06F 17/5095* (2013.01); *G06K 9/00476* (2013.01); *G06F 2217/74* (2013.01)

(58) Field of Classification Search
None
See application file for complete search history.

(56) References Cited

U.S. PATENT DOCUMENTS 5,517,428 A * 5/1996 Williams .......................... 703/1
6,118,897 A * 9/2000 Kohno .......................... 382/190
6,606,731 B1 * 8/2003 Baum et al. .................... 716/103
2004/0236711 A1 * 11/2004 Nixon et al. ...................... 707/1
2009/0138139 A1   5/2009 Tsai et al.
2013/0311450 A1 * 11/2013 Ramani et al. ................ 707/722

FOREIGN PATENT DOCUMENTS

EP    1503301 A2    2/2005
EP    1876553 A1    1/2008

OTHER PUBLICATIONS

Yu et al., "A System for Recognizing a Large Class of Engineering Drawings," 1995 IEEE, pp. 791-794.*
Jin et al., "Practical Technique in Conversion of Engineering Drawings to CAD Form," 1998 IEEE, pp. 8-13.*
Yang et al., "Research of the structural-learning-based symbol recognition mechanism for engineering drawings," 2010 6th IDC, pp. 346-349.*
Grimsdale et al., "A System for the Automatic Recognition of Patterns," The institution of Electrical Engineers, Paper No. 2792 M, Dec. 1958, pp. 210-221.*

(Continued)

*Primary Examiner* — Leigh Garbowski
(74) *Attorney, Agent, or Firm* — Ingrassia Fisher & Lorenz, P.C.

(57) ABSTRACT

A method for mapping an element of an engineering schematic into a schematic element database is provided. The method electronically scans a schematic to recognize a plurality of elements visually represented in the schematic, wherein each of the plurality of elements is associated with predefined schematic element visual attributes; and maps each of the plurality of recognized elements to any one of a plurality of saved database elements, based on common visual attributes.

19 Claims, 5 Drawing Sheets

(56) References Cited

OTHER PUBLICATIONS

Huang et al., "Associating Text and Graphics for Scientific Chart Understanding," Proc. of the 2005 Eighth Int'l Conf. on Document Analysis and Recognition (ICDAR'05), 2005 IEEE, 5 pages.*
Vaxiviere P, et al.; Celesstin: CAD conversion of mechanical drawings; Computer, IEEE, US vol. 25, No. 7, Jul. 1, 1992.
Adam S, et al.; Symbol and Character Recognition: Application to Engineering Drawings; International Journal on Document Analysis and Recognition; vol. 3, No. 2, Dec. 1, 2000.
Krause FL, et al.; Automatic Recognition of Scanned Technical Drawings; Computer Analysis of Images and Patterns; Sep. 13, 1993.
Luo Yan, et al.; Engineering Drawings Recognition Using a Case-Based Approach; Document Analysis and Recognition; Conference on Aug. 3-6, 2003.
Extended European Search Report for EP 14192365.6-1901 dated Apr. 20, 2015.
Wampler, J. et al.; Service Manual Generation: An Automated Approach to Maintenance Manual Development, 16th Human Factors in Aviation Maintenance Symposium, Apr. 2-4, 2002.

* cited by examiner

METHODS AND APPARATUS TO MAP SCHEMATIC ELEMENTS INTO A DATABASE

TECHNICAL FIELD

Embodiments of the subject matter described herein relate generally to identifying electrical or mechanical components in an engineering schematic. More particularly, embodiments of the subject matter relate to identifying representations of electrical or mechanical components by mapping such representations to existing counterparts in a database.

BACKGROUND

A vehicle health management model provides the capability to import existing design data, service procedures and maintenance records for use in development of automated monitoring, diagnostic, prognostic and maintenance support systems. Since most of this data is located in multiple manuals, complex engineering drawings, control block diagrams, and the like, it is necessary to have a mechanism to import all of them quickly and accurately into the model. Although it is a relatively simple task to import textual data into a vehicle health management model, it is a challenge to electronically scan all required engineering schematics to quickly and accurately extract component information for the model.

Accordingly, it is desirable to use an algorithm to scan existing engineering schematics and to extract schematic element data from engineering schematics. In addition, it is desirable to automatically link the schematic element data to previously defined schematic elements in the model. Furthermore, other desirable features and characteristics will become apparent from the subsequent detailed description and the appended claims, taken in conjunction with the accompanying drawings and the foregoing technical field and background.

BRIEF SUMMARY

A method for mapping an element of an engineering schematic into a schematic element database is provided. The method electronically scans a schematic to recognize a plurality of elements visually represented in the schematic, wherein each of the plurality of elements is associated with predefined schematic element visual attributes; and maps each of the plurality of recognized elements to any one of a plurality of saved database elements, based on common visual attributes.

A system for mapping an element of an engineering schematic into a schematic element database is provided. The system includes: a scanning module, configured to identify a plurality of new elements from the engineering schematic and to recognize properties associated with each of the identified plurality of new elements; and a linking module, configured to link each of the identified plurality of new elements to one of a plurality of existing elements in the schematic element database, based on the properties.

A non-transitory, computer-readable medium containing executable instructions thereon, which, when executed by a processor, are configured to execute a method. The method scans a schematic element; recognizes a plurality of visual attributes of the schematic element; compares the recognized visual attributes to a database of predefined visual attributes associated with a plurality of existing schematic elements; and when a match has been located, maps the schematic element to one of the plurality of existing schematic elements in the database.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods used to map, or in other words, to link an unidentified element from an engineering schematic to an already existing schematic element description stored in a database, to complete a description of the unidentified schematic element for use in a testing model. In certain embodiments, an existing counterpart schematic element is identified for the unidentified schematic element using visual attributes common to both schematic elements. In some embodiments, more than one potential counterpart schematic element is identified and user input is received to select an appropriate counterpart schematic element. Once a counterpart schematic element has been identified, the unidentified schematic element is mapped, or linked, to the existing counterpart schematic element. This mapping identifies the previously unidentified schematic element using an entity type and additional, descriptive attributes associated with the existing counterpart schematic element.

In the context of this application, a schematic element may be defined as an object, or a portion of an object, used in a fault model, and is represented by a shape. Each shape corresponds to a particular entity type for a particular drawing type, and each entity type is defined in a system database. Unidentified schematic elements may become associated with an entity type by being mapped to existing schematic elements, or defined entity types, stored in the system database.

Figure 1:
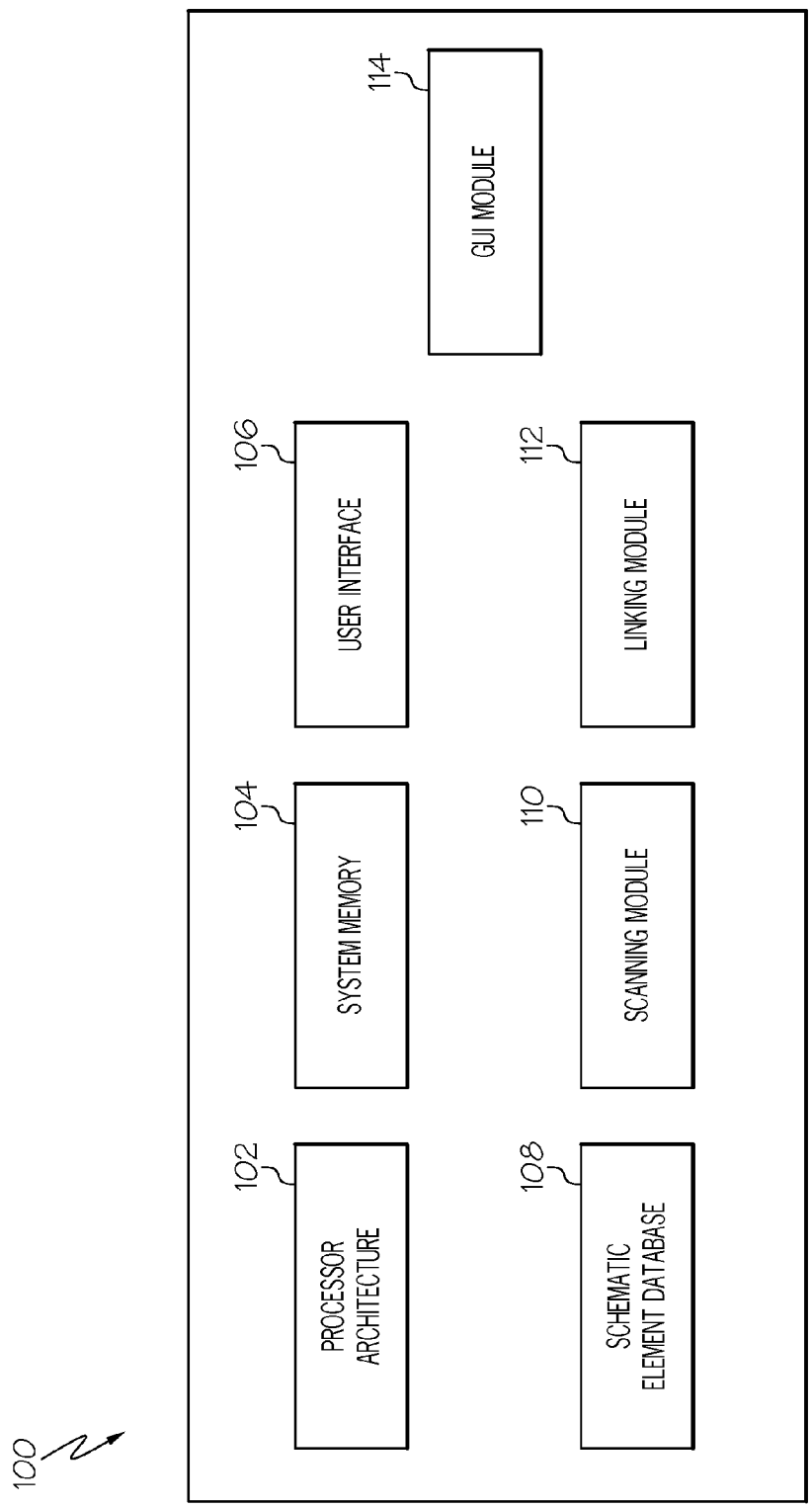
FIG. 1 is a block diagram representation of a schematic element mapping system, according to some embodiments.

Referring now to the drawings, FIG. 1 is a block diagram representation of a schematic element mapping system 100, according to some embodiments. The schematic element mapping system 100 may be implemented using any desired platform. For example, the schematic element mapping system 100 could be realized as any of the following, without limitation: a desktop computer, a laptop computer, a server system, a mobile device, a specialized piece of diagnostic equipment, or any other device that includes a processor architecture 102.

The schematic element mapping system 100 may include, without limitation: a processor architecture 102, system memory 104, a user interface 106, a schematic element database 108, a scanning module 110, a linking module 112, and a graphical user interface (GUI) module 114. In practice, an embodiment of the schematic element mapping system 100 may include additional or alternative elements and components, as desired for the particular application. For example, additional components such as displays and user input components may be employed without departing from the scope of the present disclosure. For ease of illustration and clarity, the various physical, electrical, and logical couplings and interconnections for these elements and features are not depicted in FIG. 1. Moreover, it should be appreciated that embodiments of the schematic element mapping system 100 will include other elements, modules, and features that cooperate to support the desired functionality. For simplicity, FIG. 1 only depicts certain elements that relate to the schematic element mapping techniques described in more detail below.

The processor architecture 102 may be implemented using any suitable processing system, such as one or more processors (e.g., multiple chips or multiple cores on a single chip), controllers, microprocessors, microcontrollers, processing cores and/or other computing resources spread across any number of distributed or integrated systems, including any number of "cloud-based" or other virtual systems.

The processor architecture 102 is in communication with system memory 104. The system memory 104 represents any non-transitory short or long term storage or other computer-readable media capable of storing programming instructions for execution on the processor architecture 102, including any sort of random access memory (RAM), read only memory (ROM), flash memory, magnetic or optical mass storage, and/or the like. It should be noted that the system memory 104 represents one suitable implementation of such computer-readable media, and alternatively or additionally, the processor architecture 102 could receive and cooperate with external computer-readable media that is realized as a portable or mobile component or application platform, e.g., a portable hard drive, a USB flash drive, an optical disc, or the like.

The user interface 106 is operatively associated with the processor architecture 102. The user interface 106 is implemented using hardware capable of transmitting user input into the schematic element mapping system 100, to include without limitation: a computer keyboard, mouse, touch-pad, and/or trackball and screen; a touch-screen device; a voice recognition interface; or the like.

The schematic element database 108 may be implemented in system memory 104 and/or elsewhere, including external memory devices (described above in relation to potential implementations of system memory 104). In certain embodiments, schematic elements are used in engineering drawings to represent hardware components. A component may be defined as an individual device that exists and functions cooperatively as part of a vehicle, and which may be included in, and described for purposes of being used in, a fault model. Components are typically replaceable at service or maintenance facilities without significant complex work, and may include, without limitation, control modules, pumps, valves, circuitry, or the like.

The schematic element database 108 includes a library of potential schematic elements, categorized by the type of engineering drawing from which the drawing element may be identified. The identity, or in other words, the entity type, of each schematic element is tied to the applicable drawing type. For example, a drawing of type X may include a schematic element A. A drawing of type Y may also include a schematic element A, but schematic element A may be known as schematic element B in the context of drawing type Y.

In certain embodiments, the schematic element database 108 is maintained continuously and is utilized in the creation of a range of vehicle health management models. In this case, the schematic element database 108 may include complete and detailed schematic element descriptions, to include schematic element names and associated schematic element visual attributes and descriptive attributes, applicable to creating and using vehicle health management models. Schematic element attributes may be included in the schematic element database as text. Visual attributes may include shape, size, color, and the like, while descriptive attributes may include additional, non-visual characteristics of the component represented by a schematic element.

The scanning module 110 is suitably configured to electronically scan engineering drawings (i.e., engineering schematics) to recognize the existence of schematic elements visually represented therein. The scanning module 110 extracts information associated with each recognized schematic element, including characteristics or visual attributes of each schematic element. In certain embodiments, engineering drawings may be any type of vector image, and in some embodiments, utilize a scalable vector graphics (SVG) standard. Each engineering drawing, or schematic, is associated with a type, and each type of engineering drawing may include any applicable number of schematic elements from a type-specific set. Types of engineering drawings may include, without limitation: circuit diagrams, troubleshooting trees, communication diagrams, fault trees, and the like.

Generally, engineering drawings are provided in a "vector" format. In certain embodiments, the engineering drawing utilizes a different standard and is not provided in a vector format; in this case, the schematic element mapping system 100 is configured to convert the engineering drawing into the common vector format. The vector format provides a position and size of every schematic element (i.e., every object) in the drawing. Objects may be simple points, such as an individual pixel, but typically include a more complex shape (e.g., a line, a square, a circle, etc.), a position, and a size. Schematic elements, or shapes, are grouped together in the vector drawing to make vector drawing objects. The schematic element mapping system 100 identifies the vector drawing objects and then attempts to match the pattern of one or more shapes in the object to a pattern of shapes in the schematic element database to identify a type of the object. In some embodiments, text is also embedded in a vector drawing object, and the schematic element mapping system 100 recognizes the text and uses it for matching to existing fault model objects or in the creation of a new one.

Schematic elements are differentiated by their visual attributes, such as a shape, which is recognized by the scanning module 110. Schematic elements may be further distinguishable using additional visual attributes, such as color, size, and other distinctive characteristics. Schematic element visual attributes (and descriptive attributes) may be represented as text, using extensible markup language (XML), and such text descriptions may be stored in the schematic element database 108.

Figure 2:
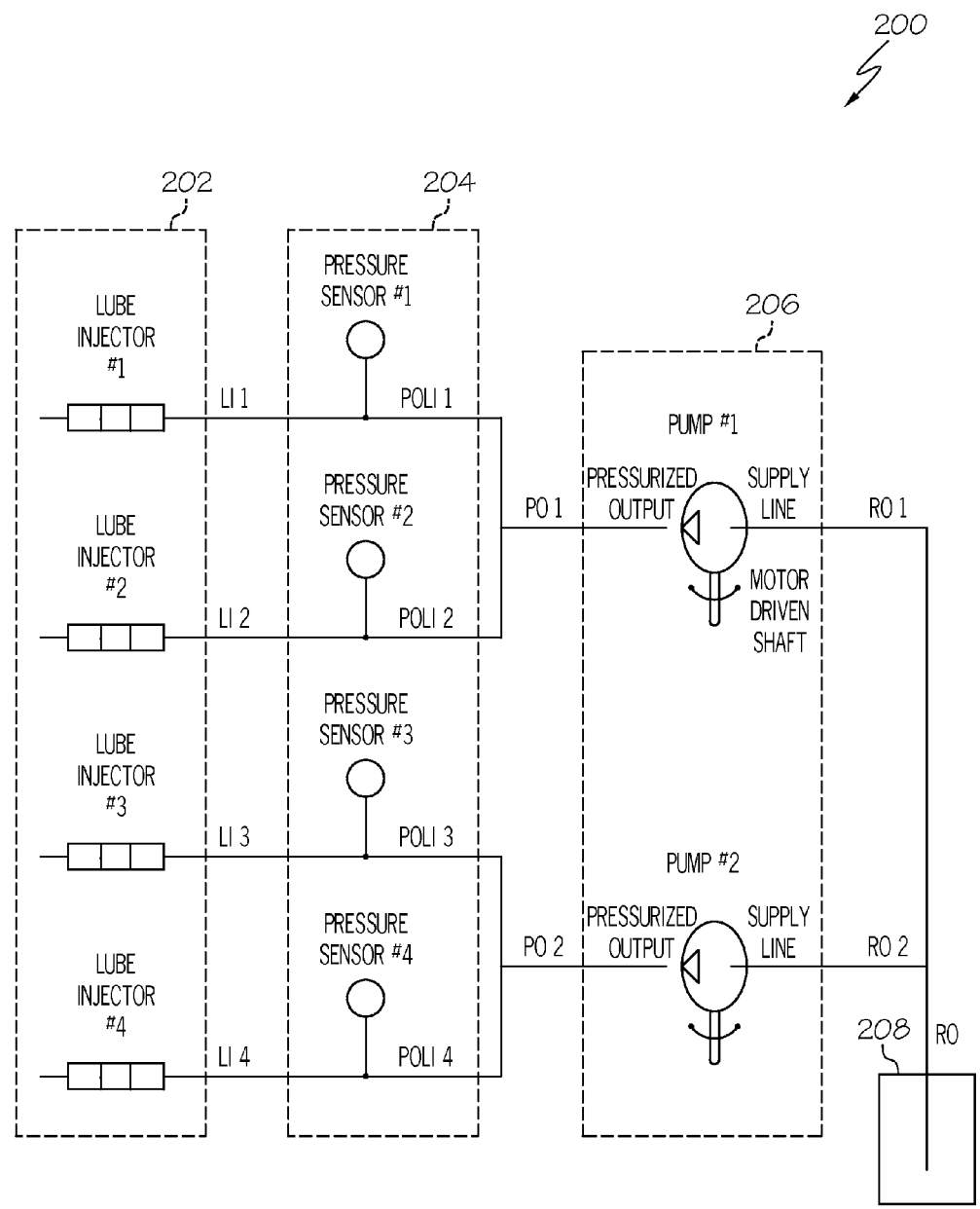
FIG. 2 is a diagram of an engineering drawing for use with the schematic element mapping system, according to some embodiments.

An exemplary embodiment of an engineering drawing 200 is shown in FIG. 2. Here, the engineering drawing 200 includes schematic elements, including schematic elements to represent lube injectors 202, schematic elements to represent pressure sensors 204, schematic elements to represent pumps 206, and a schematic element to represent a reservoir 208. Here, each of the schematic elements includes particular visual attributes, such as shape and size. The schematic elements representing lube injectors 202 are distinguishable by their rectangular shape including two bars dividing the rectangle. The schematic elements representing the pressure sensors 204 are distinguishable by their circle-attached-to-bar shape. The schematic elements representing the pumps 206 are distinguishable by their oval shape and internal triangle shape. The schematic element representing the reservoir 208 is distinguished by its large rectangular shape with no additional visual indicia.

Referring back to FIG. 1, when the scanning module 110 scans an engineering drawing, each schematic element is recognized and cataloged for further identification. In certain embodiments, a schematic element may be tagged by a user as not requiring further identification. In some embodiments, a group of schematic elements may be grouped into a single, new schematic element, which may be identified instead of each of the group of schematic elements. Conversely, a single large schematic element may be divided into a group of smaller schematic elements, and each of the smaller schematic elements may be identified instead of the large schematic element.

In practice, the scanning module 110 may be implemented with (or cooperate with) the processor architecture 102 to perform at least some of the functions and operations described in more detail herein. In this regard, the scanning module 110 may be realized as suitably written processing logic, application program code, or the like.

Figure 3:
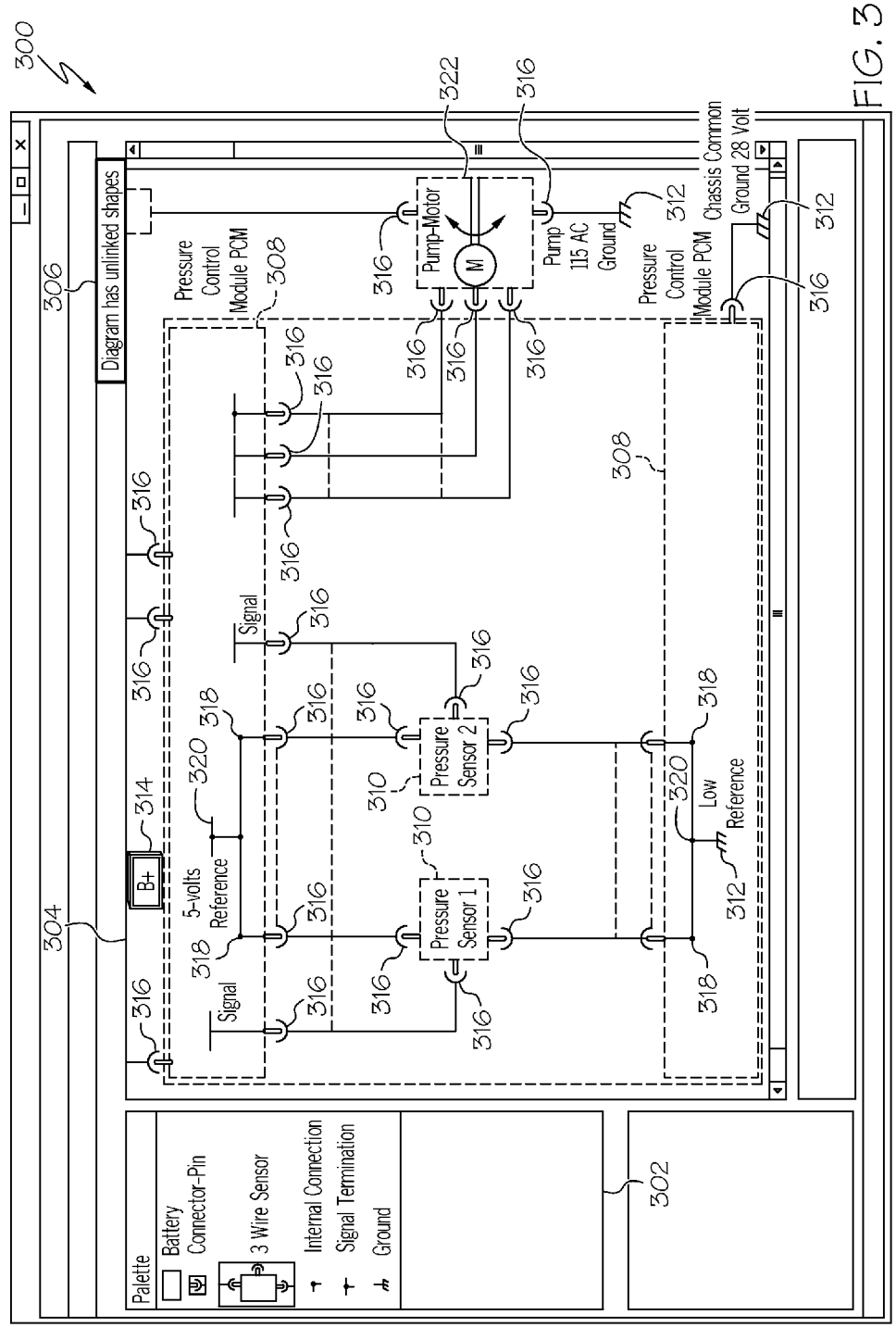
FIG. 3 is a diagram of a scanned engineering drawing, for use with the schematic element mapping system, according to some embodiments.

An exemplary embodiment of a scanned engineering drawing is shown in FIG. 3. Here, the scanned drawing 304, including recognized schematic elements, is shown in a graphical user interface (GUI) 300. The GUI 300 presents to a user the drawing 304 and a group of predefined schematic elements 302 from the schematic element database that are applicable to the current drawing type, and which may be applicable to the current drawing 304. In addition, the GUI 300 presents to the user a warning message 306, indicating that there are unlinked schematic elements displayed in the drawing 304.

As shown, the drawing 304 includes the following recognized schematic elements: three-wire sensors 310; ground 312; a battery 314; connector pins 316; internal connections 318; and signal terminations 320. In certain embodiments, predefined schematic elements 302 (e.g., schematic elements recognized in the drawing 304) are presented to the user on a palette. Unrecognized (e.g., unlinked) schematic elements in the drawing 304 are "seen" by the system, thus recognizing their existence and the need for linking/mapping to existing, predefined counterpart schematic elements in the schematic element database. As shown, unrecognized schematic elements include pressure control modules 308 and a motor-driven pump 322. Once mapped to existing counterpart schematic elements in the schematic element database, icons representing the pressure control modules 308 and the motor-driven pump 322 will appear with the group of recognized, predefined schematic elements 302.

Referring back to FIG. 1, once the scanning module 110 has scanned an engineering drawing and recognized the existence of each scanned schematic element, the schematic element mapping system 100 specifically identifies each recognized schematic element for further use in the vehicle health management model. The linking module 112 is suitably configured to map each of the recognized schematic elements to an existing, predefined schematic element in the schematic element database 108. This mapping provides a complete, existing description (including all of the descriptive attributes of the existing schematic element) for a newly identified schematic element, rendering the newly identified schematic element usable within the model.

In certain embodiments, the linking module 112 performs a lookup to determine whether a predefined, existing schematic element, possesses the same visual attributes as the newly-scanned schematic element. In some embodiments, an existing schematic element has the same shape as the new schematic element, meeting the minimum criteria to be deemed possessing the same visual attributes. In some embodiments, the existing schematic element not only has the same shape, but additional similar visual attributes, such as color and size. When the existing schematic element has the same visual characteristics as the new schematic element, the new schematic element is linked (i.e., mapped) to the predefined, existing schematic element, providing an entity type and additional associated characteristics to the new schematic element.

The schematic element mapping system 100 is configured to "learn", and to identify newly scanned schematic elements using the additional information acquired when new schematic elements are mapped to an existing schematic element. Each time a new schematic element is linked to an existing schematic element, the system retains this information and will automatically link the two schematic elements the next time another engineering drawing of the same type is scanned.

In some embodiments, after scanning an engineering drawing, the schematic element mapping system 100 creates a user-viewable registry, or in other words, a list, of the schematic elements represented in the drawing. In certain embodiments, separate lists of scanned schematic elements may be created, including a list of mapped schematic elements and/or a list of schematic elements that have not yet been mapped.

Figure 4:
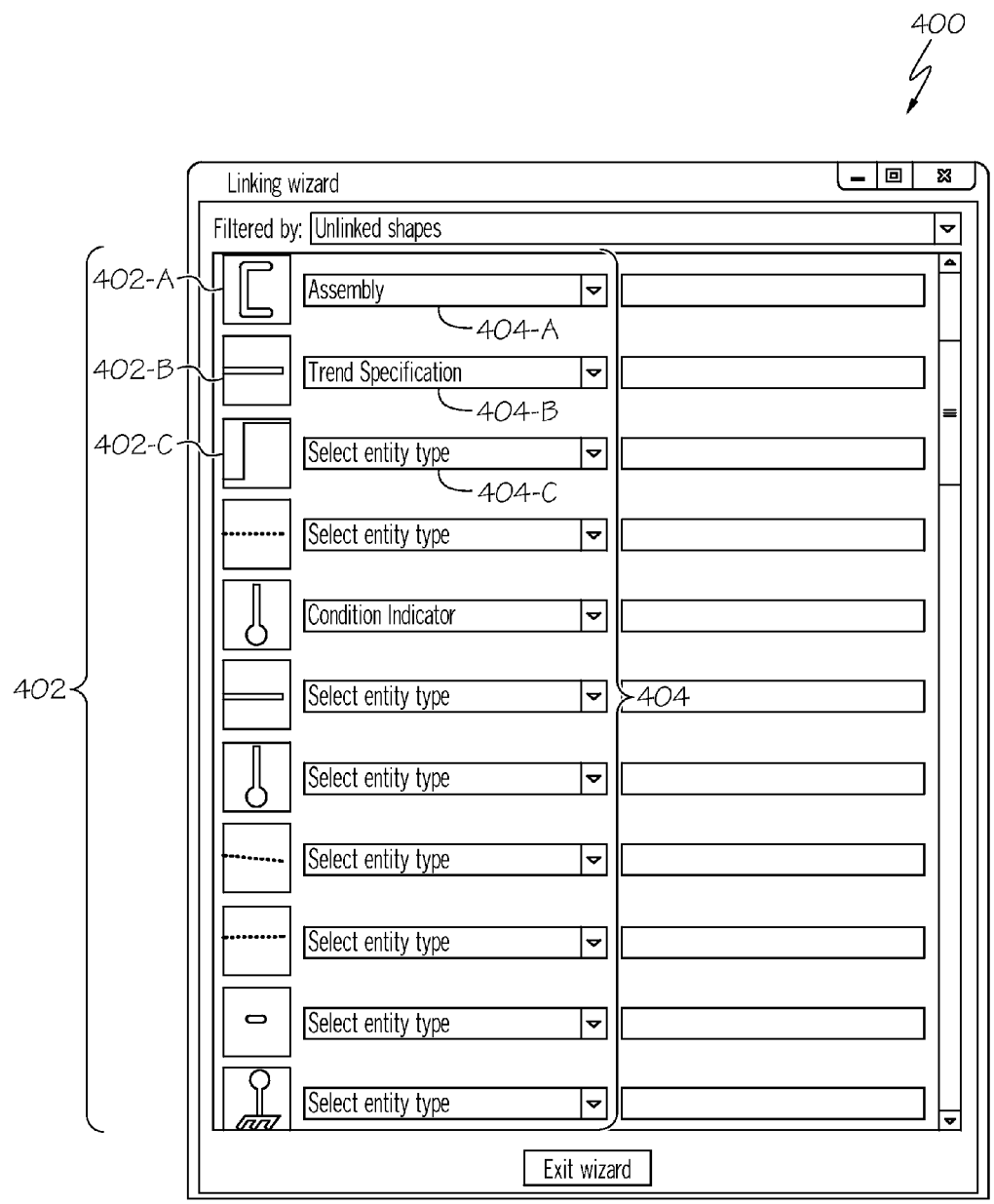
FIG. 4 is a diagram of a graphical user interface (GUI) for use with the schematic element mapping system, according to some embodiments.

The GUI module 114 is suitably configured to create and present a graphical user interface (GUI) operable to link newly scanned schematic elements to existing schematic elements saved in the schematic element database 108. An exemplary embodiment of one such GUI is shown in FIG. 4, and is referred to as a Linking Wizard 400. The Linking Wizard 400 presents a user with any unlinked schematic elements 402 in a scanned drawing. The unlinked schematic elements 402 are shown next to associated drop-down menus 404 of potential mapping choices. Mapping choices are acquired by the schematic element mapping system by performing a lookup to determine predefined, existing schematic elements possessing the same visual attributes as the unlinked schematic elements 402 from the scanned drawing.

In certain embodiments, a drop-down menu 404 presents one mapping choice that has been selected by the schematic element mapping system based on common visual attributes. For example, unlinked schematic element 402-A is shown next to drop-down menu 404-A, illustrating that the system has defined unlinked schematic element 402-A as an "Assembly". Further, unlinked schematic element 402-B is shown next to drop-down menu 404-B, illustrating that the system has defined unlinked schematic element 402-B as a "Trend Specification". In some embodiments, a drop-down menu 404 presents more than one mapping choice, along with a request to a user to provide input making the appropriate selection. For example, unlinked schematic element 402-C is shown next to drop-down menu 404-C, which shows the text "Select entity type". Once drop-down menu 404-C is clicked by a user, it displays two or more potential choices from which a user may select. Once a schematic element selection for each of the unlinked schematic elements 402 in the Linking Wizard 400 has been made, the user exits the Linking Wizard 400 and each of the unlinked schematic elements 402 is mapped to the selected choices.

In certain embodiments, when an unidentified schematic element 402 is selected in the Linking Wizard 400, the corresponding representation of the unidentified schematic element in a separate drawing representation (such as that shown in FIG. 3) is presented using contrasting visual characteristics. These contrasting visual characteristics may include highlighting the schematic element, presenting the schematic element in a contrasting color, presenting the schematic element as a flashing icon, or the like.

Figure 5:
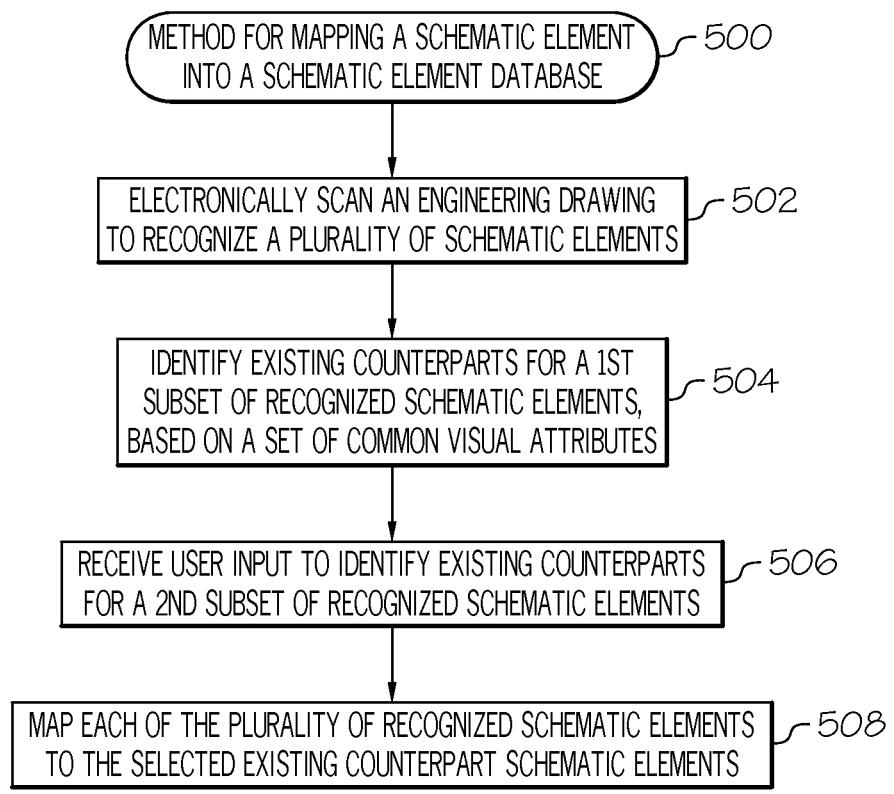
FIG. 5 is a flowchart that illustrates an embodiment of a process of using a schematic element mapping system, according to some embodiments.

FIG. 5 is a flowchart that illustrates an embodiment of a process 500 of using a schematic element mapping system, according to some embodiments. The various tasks performed in connection with process 500 may be performed by software, hardware, firmware, or any combination thereof. For illustrative purposes, the following description of process 500 may refer to elements mentioned above in connection with FIGS. 1-4. In practice, portions of process 500 may be performed by different elements of the described system, e.g., the scanning module and/or the linking module of the schematic element mapping system. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. Moreover, one or more of the tasks shown in FIG. 5 could be omitted from an embodiment of the process 500 as long as the intended overall functionality remains intact.

For ease of description and clarity, it is assumed that process 500 begins by electronically scanning an engineering drawing to recognize a plurality of schematic elements (step 502). Generally, the schematic is a vector drawing, and the scanning process recognizes the existence of, and obtains information associated with, each of the schematic elements. In certain embodiments, the information includes visual attributes associated with each scanned schematic element. When the engineering drawing is electronically scanned, the process 500 converts the drawing into a textual format, to include the visually represented schematic elements. In certain exemplary embodiments, the converted textual format includes extensible markup language (XML).

Next, the process 500 identifies existing counterpart schematic elements for a first subset of the recognized, scanned schematic elements based on a set of common visual attributes (step 504). Each unidentified schematic element in the scanned engineering drawing possesses a group of characteristics (e.g., visual attributes), to include size, shape, color, and the like. Characteristic information is extracted during the scanning process (step 502). The process 500 compares characteristics associated with the unidentified schematic element with characteristics (e.g., visual attributes) associated with existing schematic elements in a database. In certain embodiments, each engineering drawing is associated with a type, and schematic elements are standardized across the drawing type. Thus, the characteristics associated with an unidentified schematic element from Schematic Type A are compared to characteristics associated with existing schematic elements for Schematic Type A only.

Here, the characteristics are compared to locate a match. In certain embodiments, the characteristics include visual attributes of each schematic element. When an existing schematic element possesses visual attributes in common with the unidentified schematic element, the match has been located, and the process moves to the next step. The matching unidentified schematic element and the existing schematic element may share the same shape, size, color, and/or other visual attributes associated with each.

Generally, the recognized visual attributes of the newly-scanned schematic element must be identical to the visual attributes of an existing schematic element. However, when multiple matching shapes for multiple newly-scanned schematic elements are scanned, the process 500 also takes note of the relative spacing between the shapes, the orientation of the shape, and the color, line style, and fill of each of the newly-scanned schematic elements. The process 500 may utilize any of the visual attributes described in determining a match.

The process 500 then receives user input to identify existing counterparts for a second subset of recognized, scanned schematic elements (step 506). In certain embodiments, the comparison of visual attributes associated with the unidentified schematic element to the visual attributes associated with existing schematic elements produces more than one match. When this occurs, the process 500 requires user input to narrow the potential mapping choices to a single selection. Generally, a user selects a single existing schematic element match via a graphical user interface.

After identifying existing counterparts for both subsets of the scanned schematic elements, the process 500 maps each of the plurality of scanned schematic elements to the selected existing counterpart schematic element (step 508). Mapping each of the unidentified schematic elements to an existing schematic element links the unidentified schematic elements with an entity type and an existing profile of descriptive attributes, and the unidentified schematic element is therefore identified. The system retains this information for future use, and the next time a schematic of the same type is scanned, the process 500 automatically associates the formerly unidentified schematic element with the mapped entity type.

The process 500 provides the capability of converting engineering drawings into a vector format, and mapping and storing them in a well-structured database model. This enables the complex drawings to be made readable, searchable, and to select/utilize component representations (i.e., schematic elements) individually or by group, when similar or identical. These features provide advanced analysis capability for complex engineering drawings to ensure that each drawing is consistent, complete, and correct.

Practical applications for the schematic element mapping system include: (i) automatic generation of fault model content based on diagram content; and (ii) directed troubleshooting in a diagnostic system. First, fault model content may be automatically generated. An engineering drawing represents relationships between schematic elements (i.e., objects) via circuits. Based on predefined, generic failure modes for component types and circuit types, failure modes may be automatically generated for the components and circuits represented in an engineering schematic. Second, the engineering drawings in a diagnostics system may be used to provide directed troubleshooting. Here again, using the predefined failure modes associated with represented components and circuits, an engineering drawing may be displayed during performance of diagnostic procedures. As the diagnostic procedures are used to rule out various components and circuits as the cause of the system failure, the color of a potentially faulty object (i.e., schematic element) may be changed. In certain embodiments, a potentially faulty object may be presented in yellow, while a failed object may be presented in red, and an object not associated with failure may be presented in green. In other embodiments, other visually distinguishing characteristics may be utilized instead.

In addition to the schematic element mapping system application described above, the system may also automatically generate communication and/or dependency links between components, represented by schematic elements, in an engineering drawing. Such information is useful in diagnosing faults and verifying a propagation path of continuity, and also in reducing the required manual effort involved in conventional fault modeling methods.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for mapping an element of an engineering schematic into a schematic element database, the method comprising:
   electronically scanning a schematic;
   recognizing existence of a plurality of elements visually represented in the schematic, based on the scanning, wherein each of the plurality of elements is associated with predefined schematic element visual attributes, the predefined schematic element visual attributes comprising element size, element shape, and element color;
   converting the schematic, including the plurality of elements and the predefined schematic element attributes, into a textual format comprising extensible markup language (XML);
   comparing the textual format of the predefined schematic element visual attributes to a plurality of saved database elements, the plurality of saved database elements being stored in the schematic element database, and each of the plurality of saved database elements being associated with XML-based descriptions of visual attributes; and
   mapping each of the plurality of elements to any one of a plurality of saved database elements, based on common XML-based descriptions of visual attributes.

2. The method of claim 1, further comprising:
   after scanning the engineering schematic,
      identifying existing counterparts for a first subset of the plurality of elements, based on a set of common predefined schematic element visual attributes;
      receiving user input to identify existing counterparts for a second subset of the plurality of recognized elements; and
      wherein the mapping step is based on the identified existing counterparts for the first subset of the plurality of recognized elements and the identified existing counterparts for the second subset of the plurality of recognized elements.

3. The method of claim 1, further comprising:
   grouping a subset of the plurality of elements to create a new schematic element;
   mapping the new schematic element to one of the plurality of saved database elements, based on a set of common predefined schematic element visual attributes.

4. The method of claim 1, further comprising:
   dividing one of the plurality of elements into a second plurality of elements; and
   mapping each of the second plurality of elements to one of the plurality of saved database elements, based on a set of common predefined schematic element visual attributes.

5. The method of claim 1, further comprising:
   tagging a subset of the plurality of elements; and
   performing the mapping step for each of the plurality of elements that is not tagged.

6. The method of claim 1, further comprising:
   prior to and during performance of the mapping step,
      recognizing a subset of the plurality of elements for which the mapping step has been performed; and
      creating a user-viewable registry of the subset.

7. The method of claim 1, further comprising:
recognizing a subset of the plurality of elements for which the mapping step has not yet been performed; and
creating a user-viewable registry of the subset.

8. The method of claim 1, further comprising:
recognizing a subset of the plurality of elements for which the mapping step has not yet been performed; and
displaying a warning message indicating existence of the subset.

9. A system for mapping an element of an engineering schematic into a schematic element database, the system comprising:
a scanning module, configured to:
scan the engineering schematic;
recognize existence of a plurality of new elements from the engineering schematic based on the scan, the plurality of new elements comprising unidentified elements; and
recognize properties associated with each of the plurality of new elements, the properties comprising visual attributes comprising element size, element shape, and element color;
a conversion module, configured to convert the schematic, including the plurality of new elements and the properties, into a textual format comprising extensible markup language (XML); and
a linking module, configured to:
compare the textual format of the properties to a plurality of existing elements in the schematic element database, the plurality of existing elements comprising identified elements, and each of the plurality of existing elements being associated with XML-based descriptions of visual attributes; and
link each of the plurality of new elements to one of the plurality of existing elements in the schematic element database, based on the comparison of the properties.

10. The system of claim 9, wherein the engineering schematic comprises a vector diagram.

11. The system of claim 9, wherein the engineering schematic and the identified plurality of new elements utilize a scalable vector graphics (SVG) standard.

12. The system of claim 9, wherein each of the properties is associated with a textual representation, in extensible markup language (XML), in the schematic element database.

13. The system of claim 9, wherein the linking module is further configured to:
compare the properties of one of the identified plurality of new elements to the properties of the plurality of existing elements; and
when a match has been located, link the one of the plurality of new elements to a counterpart existing element in the schematic element database.

14. The system of claim 9, further comprising:
a graphical user interface (GUI) module, configured to:
display one of the identified plurality of new elements and an associated drop-down menu of user-selectable options using a GUI, wherein the user-selectable options comprise a subset of the plurality of existing elements; and
receive a user input selection of one of the plurality of existing elements, via the associated drop-down menu, for linking to the one of the identified plurality of new elements.

15. The system of claim 14, wherein the GUI module is further configured to:
when the one of the plurality of new elements is selected using the GUI,
present, in a schematic area separate from the GUI, the one of the plurality of new elements using contrasting visual characteristics.

16. A non-transitory, computer-readable medium containing executable instructions thereon, which, when executed by a processor, are configured to execute a method comprising:
scanning a schematic element;
recognizing a plurality of visual attributes of the schematic element, the plurality of visual attributes comprising element size, element shape, and element color;
converting the schematic element, including the plurality of visual attributes, into a textual format comprising extensible markup language (XML);
comparing the textual format of the recognized visual attributes to a database of predefined XML-based visual attributes associated with a plurality of existing schematic elements; and
when a match has been located, mapping the schematic element to one of the plurality of existing schematic elements in the database.

17. The non-transitory, computer readable medium of claim 16, wherein the method further comprises:
when the comparing step locates more than one possible match,
presenting a list of potential matches to a user;
receiving input from the user indicating a selected match;
performing the mapping step using the selected match.

18. The non-transitory, computer readable medium of claim 16, wherein the method further comprises:
scanning a second instance of the schematic element;
identifying a match for the second instance of the schematic element, based on the previously performed mapping step; and
mapping the second instance of the schematic element to the one of the plurality of existing schematic elements in the database.

19. The non-transitory, computer readable medium of claim 16, wherein the method further comprises:
scanning a schematic, wherein the schematic comprises a plurality of schematic elements;
selecting the schematic element from the plurality of schematic elements, for analysis and mapping; and
performing the method for each of the plurality of schematic elements.

* * * * *